(12) United States Patent
Peng (10) Patent No.: US 7,564,561 B2
(45) Date of Patent: Jul. 21, 2009

(54) METHOD OF OPTICAL FREQUENCY MEASUREMENT

(75) Inventor: Jin-Long Peng, Taoyuan County (TW)

(73) Assignee: Industrial Technology Research Institute, Hsinchu County (TW)

( * ) Notice: Subject to any disclaimer, the term of this patent is extended or adjusted under 35 U.S.C. 154(b) by 417 days.

(21) Appl. No.: 11/674,118

(22) Filed: Feb. 12, 2007

(65) Prior Publication Data

US 2008/0100281 A1    May 1, 2008

(30) Foreign Application Priority Data

Oct. 25, 2006    (TW) ............................... 95139292 A (51) Int. Cl.
*G01B 9/02* (2006.01)
(52) U.S. Cl. ..................................................... 356/451
(58) Field of Classification Search ................. 356/451, 356/454
See application file for complete search history.

(56) References Cited

U.S. PATENT DOCUMENTS

| | | | |
|---|---|---|---|
| 6,785,303 B1 | 8/2004 | Holzwarth et al. | |
| 6,850,543 B2 | 2/2005 | Cundiff et al. | |
| 6,853,456 B2 * | 2/2005 | Mells | 356/484 |
| 7,324,208 B2 * | 1/2008 | Niki | 356/484 |

OTHER PUBLICATIONS

Diddams et al., Direct Link between Microwave and Optical Frequencies with a 300 THz Femtosecond Laser Comb, Physical Review Letters, May 29, 2000., 4 pages, vol. 84 No. 22.
Cundiff et al., Optical frequency synthesis based on mode-locked lasers, Review of Scientific Instruments, Oct. 2001, 23 pages, vol. 72, No. 10.
Udem et al, Optical frequency metrology, Insight Review Articles, Mar. 14, 2002, 5 pages, vol. 416.

\* cited by examiner

*Primary Examiner*—Hwa S Lee (Andrew)
(74) *Attorney, Agent, or Firm*—WPAT, PC; Anthony King (57) ABSTRACT

A method of absolute optical frequency measurement is realized by using mode-locked laser frequency combs to measure the optical frequency of an unknown laser. By varying the repetition frequency, the relative frequency location of the unknown laser to the beating comb line is determined according to the corresponding variation of the beat frequency. Also, by varying the offset frequency of the mode-locked laser, the real offset frequency detected by a self-referencing technique can be determined according to the corresponding variation of the beat frequency between the unknown laser and the mode-locked laser frequency combs. The mode number of the frequency comb is uniquely and adequately determined through measuring the beat frequencies between the unknown laser and the mode-locked laser frequency combs at various repetition frequencies and through measuring the corresponding mode number change, and hence the optical frequency of the unknown laser is determined.

42 Claims, 10 Drawing Sheets

METHOD OF OPTICAL FREQUENCY MEASUREMENT

BACKGROUND OF THE INVENTION

1. Field of the Invention

The present invention relates to a method of optical frequency measurement, and more particularly, to a method of measuring the frequency of an unknown laser by varying parameters of optical frequency combs ("frequency combs").

2. Description of the Related Art

Since Professor Hänsch from Germany applied a femtosecond mode-locked laser to measure the frequency of the D1 line of caesium atoms, mode-locked lasers have drawn more and more attention in the application of optical frequency measurement.

Figure 1:
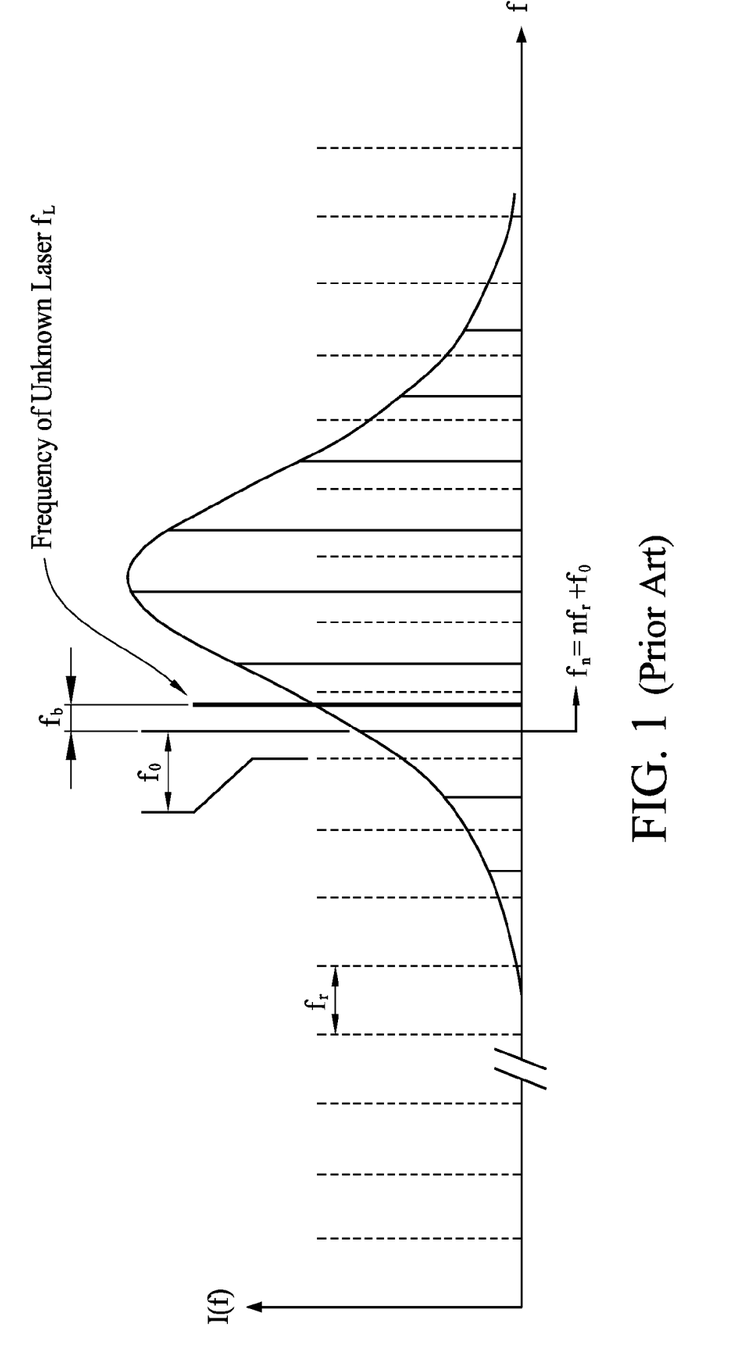
FIG. 1 shows the basic architecture for the frequency measurement of an unknown laser using a frequency comb in the frequency domain.
Figure 2:
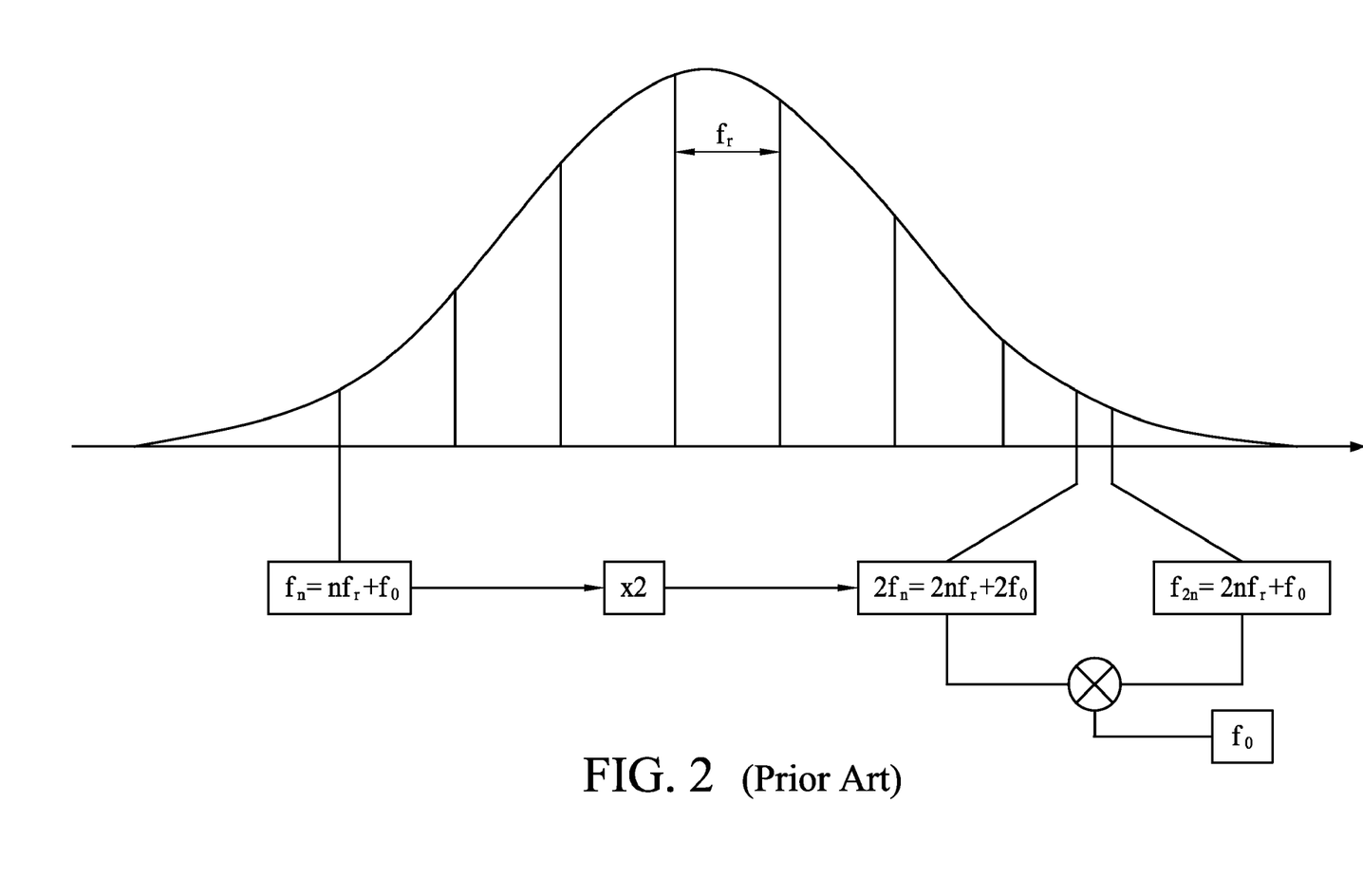
FIG. 2 is an illustrative diagram of measuring the offset frequency with an f-2f self-referencing technique.

As shown in FIG. 1, in the frequency domain, a mode-locked laser consists of frequency combs with uniform frequency intervals. The frequency of each comb line is equal to an integral multiple of the pulse repetition frequency $f_r$ plus an offset frequency $f_o$. That is, the frequency $f_n$ of the $n^{th}$ comb line is represented by the following formula:

$$f_n = n \times f_r + f_o;$$

where n is a positive integer, $f_r$ is the pulse repetition frequency ("repetition rate"), and $f_o$ is a carrier-envelope offset frequency ("offset frequency"). Usually, the offset frequency $f_o$ is measured with a self-referencing technique. FIG. 2 shows an f-2f self-referencing technique.

However, two possible values $f_{o1}$ and $f_{o2}$ smaller than $f_r$ will be obtained when the offset frequency $f_o$ of the mode-locked laser is detected with the self-referencing technique, and the two offset frequencies satisfy $f_{o1} + f_{o2} = f_r$. According to different definitions, the offset frequency can also be defined as adding an integral multiple of the repetition rate to $f_{o1}$ and $f_{o2}$ respectively. Similarly, two beat frequencies $f_{b1}$ and $f_{b2}$ can be generated between the unknown laser and the adjacent comb lines (e.g., the $n^{th}$ and the $(n+1)^{th}$ comb lines) of the mode-locked laser, where $f_{b1} + f_{b2} = f_r$. Therefore, the frequency $f_L$ of the unknown laser close to the $n^{th}$ comb line is represented by the following formula:

$$f_L = n \times f_r + f_o + f_b;$$

where $f_o = f_{o1}$ or $f_{o2}$, and $f_b = f_{b1}$ or $f_{b2}$.

The mode order number n of the frequency comb, $f_o$, and $f_b$ in the above formula need to be determined so that the frequency $f_L$ of the unknown laser can be obtained. The following conventional methods can help to determine n, $f_o$ and $f_b$, so as to determine the value of $f_L$. The first method uses historical measured frequencies of the unknown laser, and the frequencies have to be accurate within $\pm f_r/4$ to determine the value of n, $f_o$ and $f_b$. The second method is to determine the approximate frequency of the unknown laser with a wavelength meter. If the accuracy of the frequency measured by the wavelength meter is within $\pm f_r/4$, then the values of n, $f_o$, and $f_b$ can be determined. The accuracy of a normal commercial wavelength meter is approximately $2 \times 10^{-7}$, and this will cause an uncertainty of about 40 MHz for the frequency measurement of a laser with wavelength of 1550 nm. Therefore, for frequency combs with interval less than 160 MHz, the commercial wavelength meter is not accurate enough to determine the mode number.

The third method is disclosed by Long-sheng Ma et al., and does not need a wavelength meter to determine the mode number n of the frequency comb. According to their method, a frequency comb is applied to measure the beat frequency of an unknown laser under multiple groups of different repetition rates $f_r$ and $f_r'$, and the shifted mode number of the beating comb line is recorded when the repetition rate changes. The mode number n of the frequency comb is calculated according to the following formula:

$$n = [\pm f' - (\pm f_o) + m f_r' \pm f_b' - (\pm f_b)]/(f_r - f_r');$$

where m is the shifted mode number of the beating comb line when the repetition rate changes from $f_r$ to $f_r'$, and $f_b$ and $f_b'$ are the beat frequencies between the unknown laser and the beating comb line before and after the repetition rate being adjusted, respectively, and $f_o$, $f_o'$ are the offset frequencies before and after the frequency comb is adjusted. In actual optical frequency measurement, each of $f_o$, $f_o'$, $f_b$, and $f_b'$ has two possible measured values. As the value of each of $f_o$, $f_o'$, $f_b$, and $f_b'$ cannot be determined uniquely, the $\pm$ sign in the above formula cannot be determined individually. Therefore, the measurement results of two or more different m values have to be compared and analyzed to identify the correct mode number n of the beating comb line.

The three methods of optical frequency measurement described above require adequate historical measurement data, accurate wavelength meters, and a complicated procedure of comparing multiple measurement results respectively to obtain the frequency of an unknown laser.

SUMMARY OF THE INVENTION

The present invention provides a simple and systematic method for absolute optical frequency measurement, which uses mode-locked laser combs to measure the frequency of an unknown laser. By observing the beat frequency variation while changing the repetition rate of the mode-locked laser, the relative position of between the unknown laser and the frequency comb, and hence the beat frequency between them, is uniquely determined. By observing the beat frequency variation while varying the measured offset frequency, the actual offset frequency of the mode-locked laser is correctly determined. By measuring the beat frequency of the unknown laser at different repetition rates, and measuring the difference between the mode numbers of the beating comb lines, the mode number of the frequency comb is uniquely determined. Thus, the frequency of the unknown laser is absolutely determined.

An object of the present invention is to provide a systematic method of optical frequency measurement using mode-locked lasers with any repetition rates, and more particularly, to definitely determine the relative position of the unknown laser to the beating comb line by observing the beat frequency variation while adjusting the repetition rate of the mode-locked laser, and to uniquely determine the value of the offset frequency by observing the beat frequency variation while varying the control parameters to change the offset frequency of the mode-locked laser. By measuring the beat frequency at two different repetition frequencies, the mode number of the frequency comb is uniquely determined, and hence the frequency of the unknown laser is absolutely measured. This method can be applied to mode-locked lasers with any repetition rates. Therefore, the present invention is a versatile and simple method of optical frequency measurement.

Another object of the present invention is to provide a method of measuring the mode number of the frequency comb and the optical frequency without being influenced by the frequency fluctuation of the unknown laser. The beat frequencies between the unknown laser and two mode-locked lasers with different repetition rates are measured simultaneously. The relative positions of various beat frequencies and various comb lines and the correct offset frequencies of various mode-locked lasers are determined according to the aforesaid methods. The frequency fluctuation of the unknown laser can be subtracted by simultaneously measuring the two beat frequencies or by measuring the beat frequency difference directly. The mode number determination is only related to the beat frequency difference. Therefore, the determination of the mode number of the frequency comb and the measurement of the optical frequency is not influenced by the frequency fluctuation of the unknown laser.

To achieve the aforementioned objects, the present invention discloses a method of optical frequency measurement, which is applicable to measure the frequency of an unknown laser. First, at least one mode-locked laser is beating with the unknown laser, and beat frequencies occur between the $n^{th}$ comb lines of the mode-locked lasers and the unknown laser. By varying the repetition rate, the relative frequency location between the unknown laser and the $n^{th}$ comb line is determined according to the direction of change in the beat frequency. By varying parameters of the mode-locked laser, such as the power of a pump laser, the offset frequency measured with a self-referencing technique is changed accordingly. According to directions of the variation of the offset frequency and the beat frequency, the accurate value of the offset frequency is obtained. Then, the repetition rate is adjusted, and the change in the mode number of the beating comb line that generates the beat frequency with the unknown laser is measured. The value of n is determined from the repetition rate, the difference between the mode numbers of the beating comb lines, the difference in offset frequency, the beat frequencies, and the difference in repetition rate.

In order to make the aforesaid and other objects, features and advantages of the present invention comprehensible, preferred embodiments accompanied with figures are described in detail below.

BRIEF DESCRIPTION OF THE DRAWINGS

The invention will be described according to the appended drawings in which.

PREFERRED EMBODIMENT OF THE PRESENT INVENTION

The present invention provides a systematic method of optical frequency measurement, which realizes an effective measurement of the frequency of an unknown laser simply and accurately. Several embodiments are given below to illustrate the present invention. However, the present invention is not limited to the embodiments disclosed here.

Figure 3:
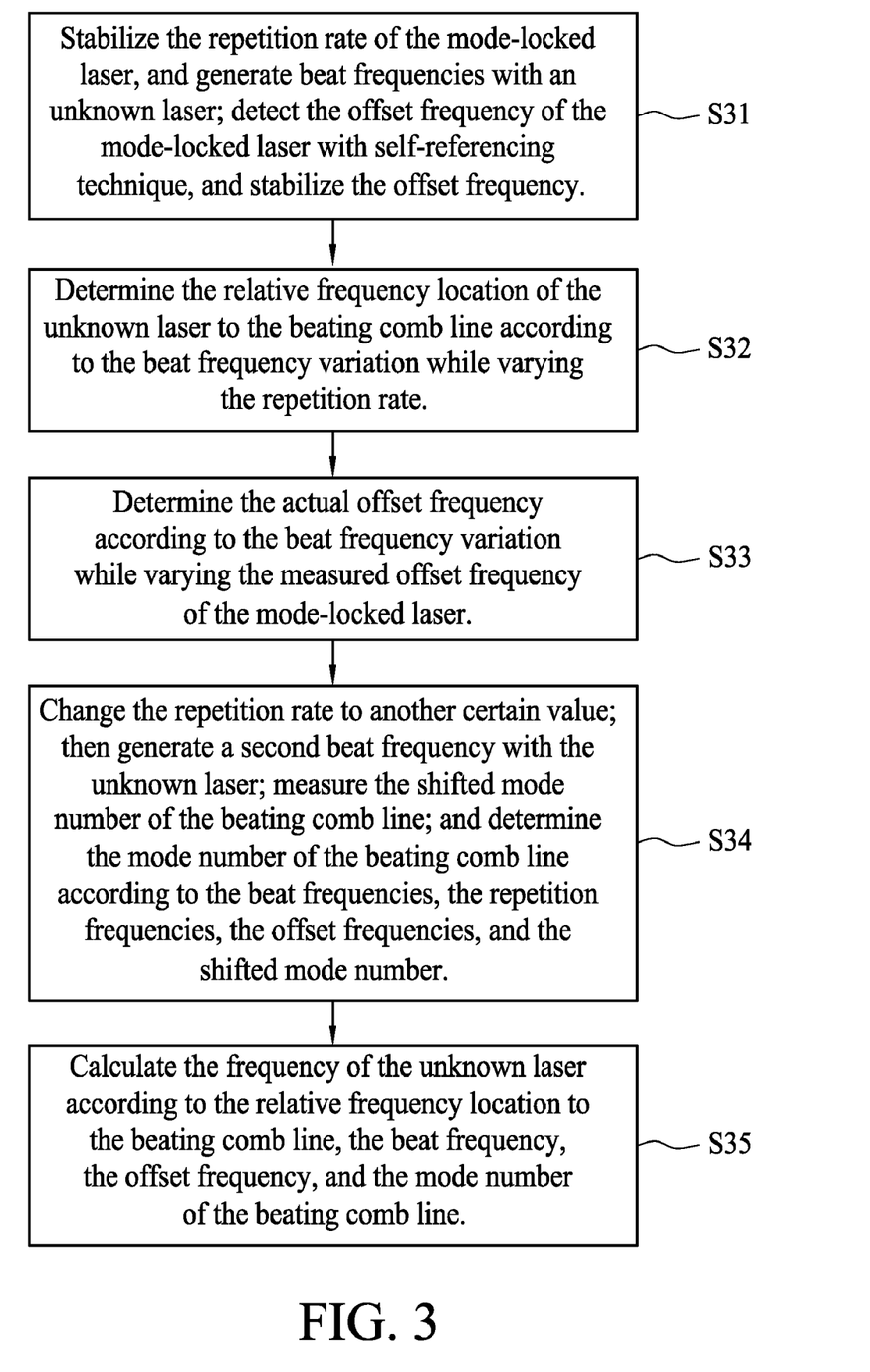
FIG. 3 is a flow chart of the method of optical frequency measurement according to the present invention.

FIG. 3 is a flow chart for optical frequency measurement of an unknown laser according to the present invention. As shown in step S31, the repetition rate of a mode-locked laser is stabilized first; the offset frequency of the mode-locked laser is measured with a self-referencing technique; and the offset frequency is stabilized. A beat frequency is generated between the $n^{th}$ comb line of the mode-locked laser and the unknown laser. When a beat frequency is detected, both lasers with frequency lower or higher than that of the comb line can generate the same beat frequency. Thus, the accurate frequency location of the unknown laser needs to be further determined. Then, the repetition rate is varied and the relative frequency location between the unknown laser and the $n^{th}$ comb line is determined according to the direction of the beat frequency variation as stated in the instruction of step S32. As shown in step S33, the offset frequency of the mode-locked laser is varied, and the actual offset frequency is determined according to the direction of the measured offset frequency variation and the direction of the beat frequency variation. After the beat frequency and the offset frequency are determined, step S34 is implemented to determine the value of the mode number n of the frequency comb. That is, the repetition rate is adjusted, and the difference in mode number between the comb lines generating the beat frequencies is measured. Afterward, the value of n is determined from the difference in mode number, the difference in offset frequency, the beat frequencies, the repetition rate, and the difference in repetition rate. By implementing the above steps, the beat frequency, the offset frequency, and the value of n are all uniquely determined. Thus, the accurate value of the frequency of the unknown laser can be absolutely calculated.

Figure 4A:
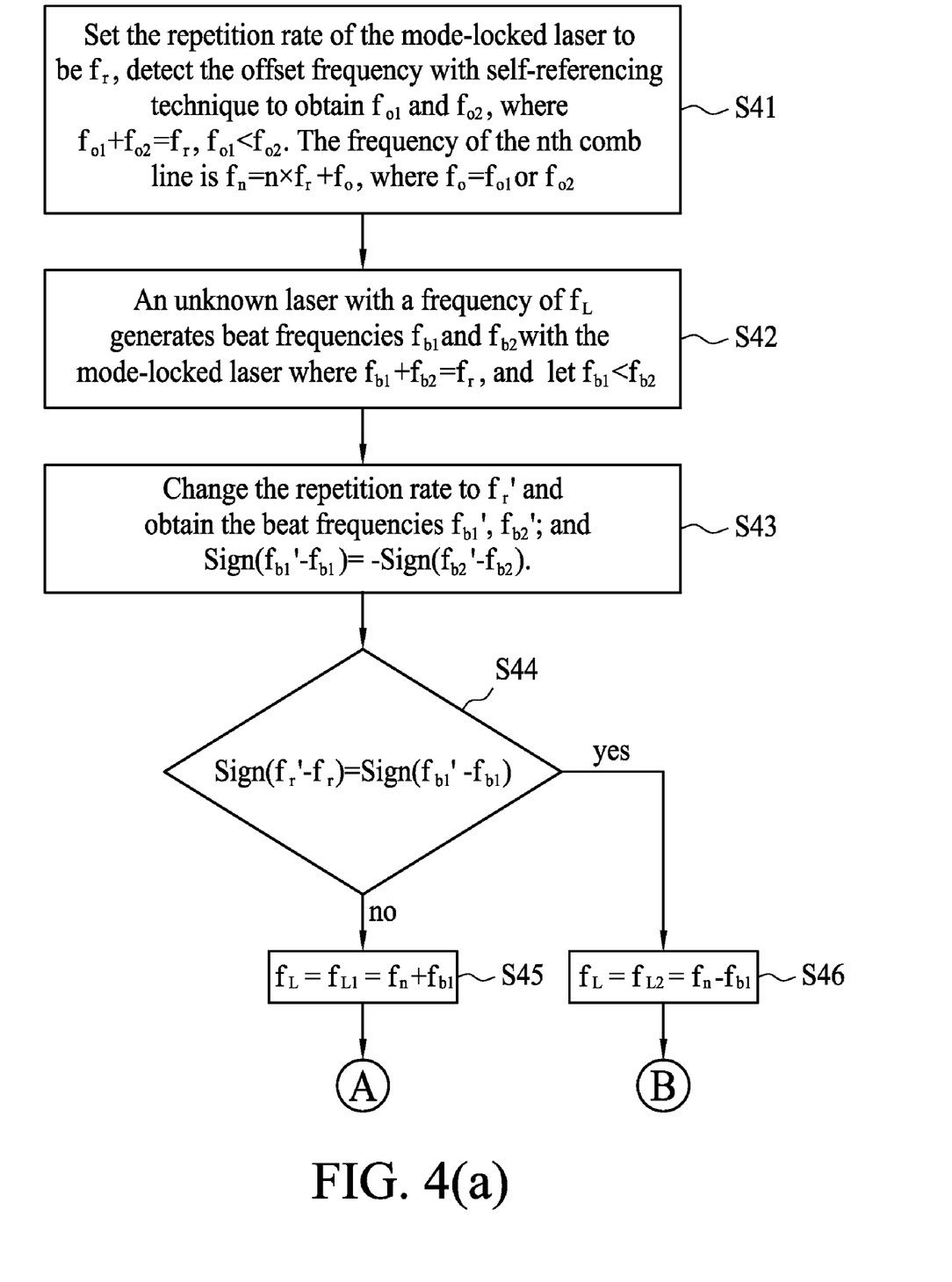
FIG. 4(a) is a flow chart of determining the relationship between the beat frequency, the unknown laser and the beating comb line according to the present invention.
Figure 4B:
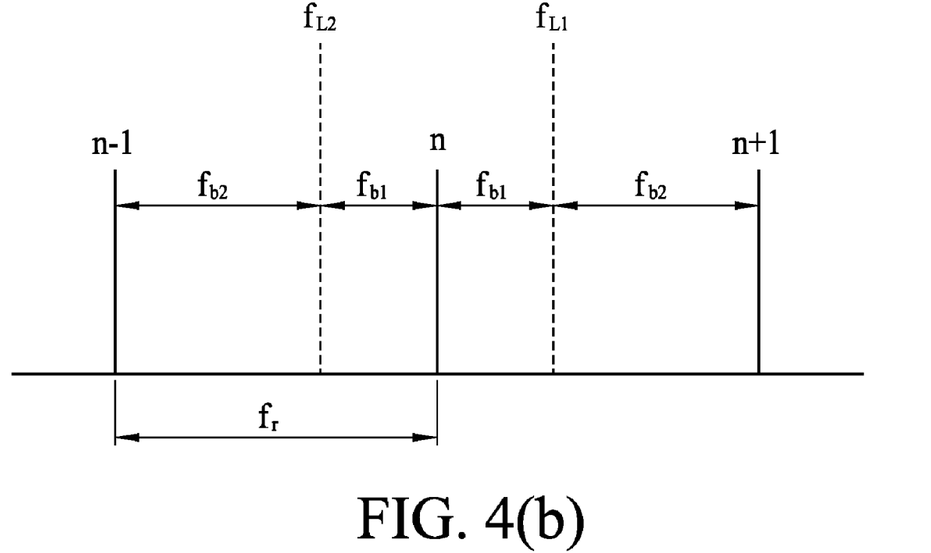
FIGS. 4(b)-4(c) are schematic diagrams of determining the relationship of the beat frequency, the unknown laser and the beating comb line according to the present invention.

FIG. 4(a) is a flow chart of determining the relation between the beat frequency, the unknown laser and the frequency comb according to the present invention. As shown in steps S41-S43, a beat frequency occurs between an unknown laser and a mode-locked laser with a repetition rate of $f_r$, and the possible value of the offset frequency of the mode-locked laser measured with the self-referencing technique is $f_{o1}$ and $f_{o2}$. Moreover, the frequency of the unknown laser is close to the frequency of the $n^{th}$ comb line, and the frequency of the $n^{th}$ comb line is $f_n = n \times f_r + f_o$, where $f_o = f_{o1}$ or $f_{o2}$ with $f_{o1} + f_{o2} = f_r$ and let $f_{o1} < f_{o2}$. The beat frequencies $f_{b1}$ and $f_{b2}$ are generated from the unknown laser and the neighboring comb lines of the mode-locked laser, where $f_{b1} + f_{b2} = f_r$ and let $f_{b1} < f_{b2}$. As shown in FIG. 4(b), the frequency $f_L$ of the unknown laser may be $f_{L1}$ or $f_{L2}$. Therefore, the relative position between the unknown laser and the $n^{th}$ comb line needs to be predetermined.

Figure 4C:
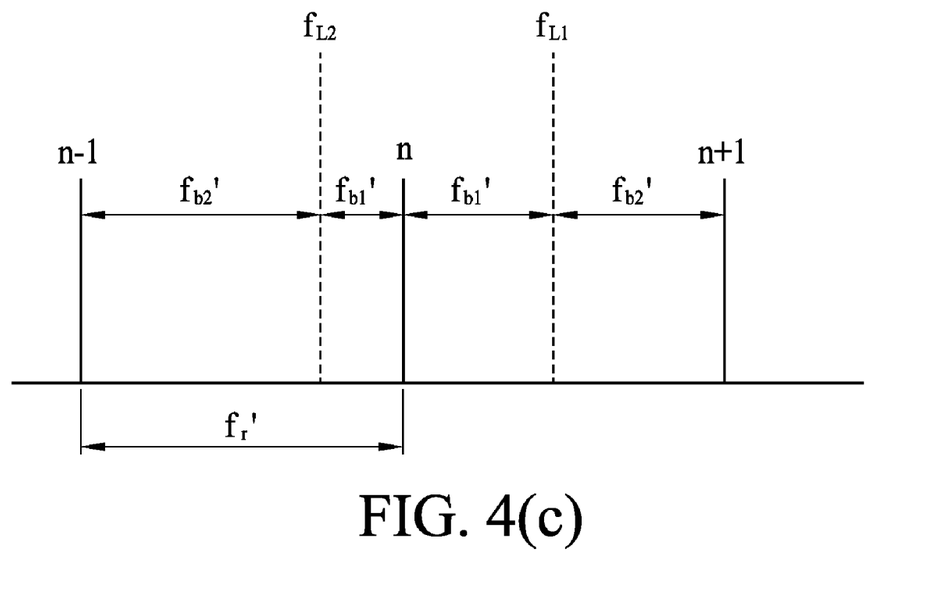

We determine the relative frequency position of the unknown laser to the $n^{th}$ comb line by observing the beat frequency variation while changing the repetition rate. As shown in FIG. 4(c), when the repetition rate is changed from $f_r$ to $f_r'$, the beat frequencies $f_{b1}$ and $f_{b2}$ shift to $f_{b1}'$ and $f_{b2}'$, respectively. As shown in step S44 of FIG. 4(a) and FIG. 4(c), $f_r'$ is smaller than $f_r$, i.e., Sign($f_r' - f_r$) is a minus. In this case, if the measured beat frequency $f_{b1}'$ is smaller than $f_{b1}$, or $f_{b2}'$ is greater than $f_{b2}$, i.e., $\text{Sign}(f_{b1}'-f_{b1})=-\text{Sign}(f_{b2}'-f_{b2})$ is also a minus, then the unknown laser locates on the left side of the $n^{th}$ comb line. Here, the left side of the frequency comb indicates a lower frequency, and the right side of the frequency comb indicates a higher frequency. Thus, the result of step S46 is obtained, i.e., $f_L=f_{L2}=f_n-f_{b1}$. On the contrary, if $\text{Sign}(f_{b1}'-f_{b1})=-\text{Sign}(f_{b2}'-f_{b2})$ is a plus, then the unknown laser locates on the right side of the $n^{th}$ comb line. Thus, the result of step S45 is obtained, i.e., $f_L=f_{L1}=f_n+f_{b1}$. According to the equation $f_{b1}+f_{b2}=f_r$, $f_{L2}=f_{n-1}+f_{b2}$ and $f_{L1}=f_{n+1}-f_{b2}$ can also be obtained. Certainly, $f_r$ can be adjusted to a greater value of $f_r'$, i.e., $\text{Sign}(f_r'-f_r)$ is a plus; and the analysis procedure of steps S44-S46 is also applicable.

Figure 5A:
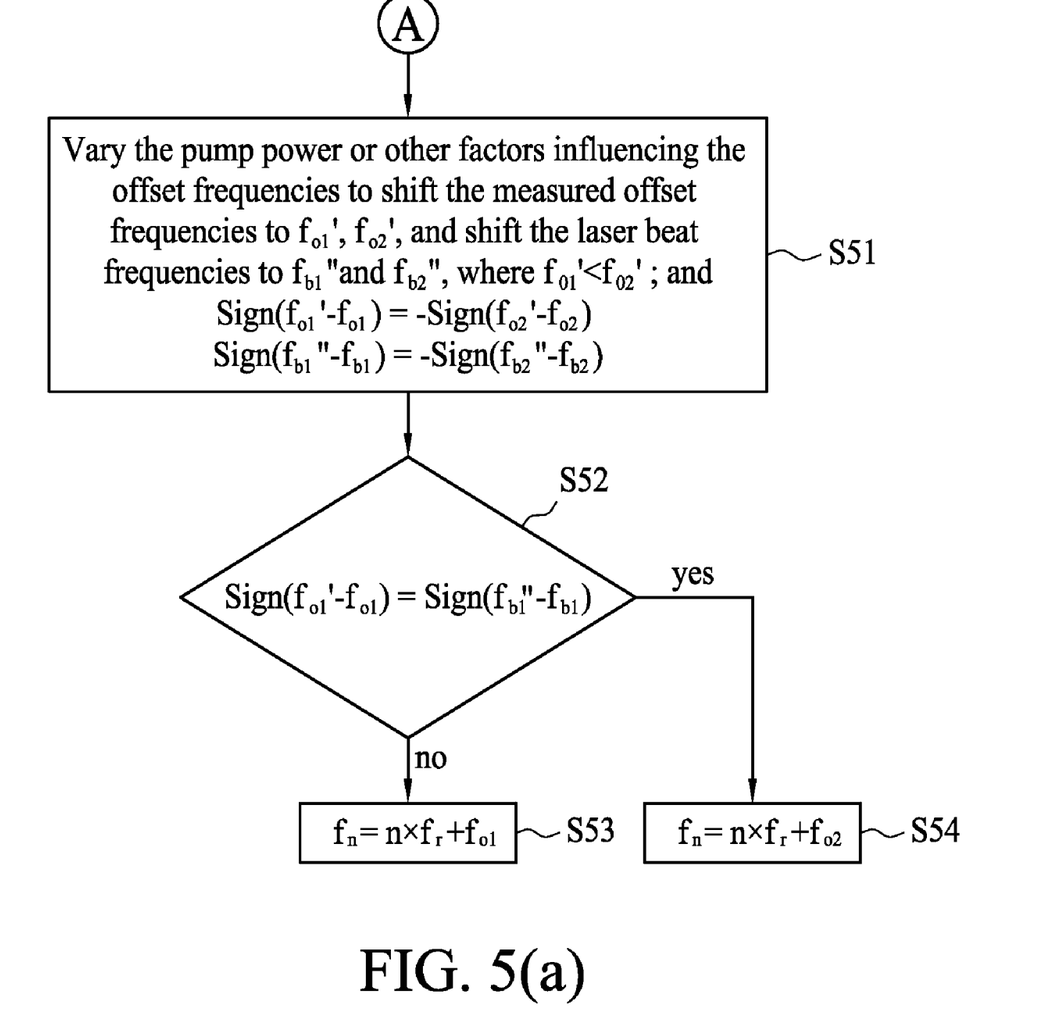
FIG. 5(a) is a flow chart of determining the accurate offset frequency according to the present invention.
Figure 5B:
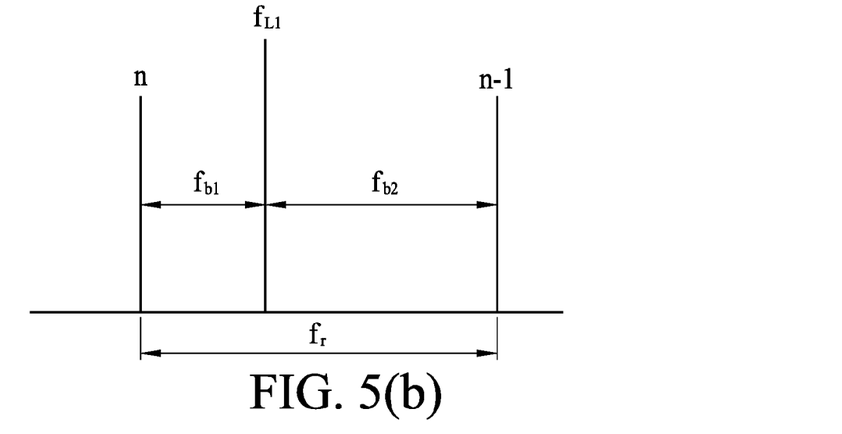
FIGS. 5(b)-5(d) are schematic diagrams of determining the offset frequency by observing the beat frequency variation while changing the offset frequency of the frequency comb according to the present invention.
Figure 5C:
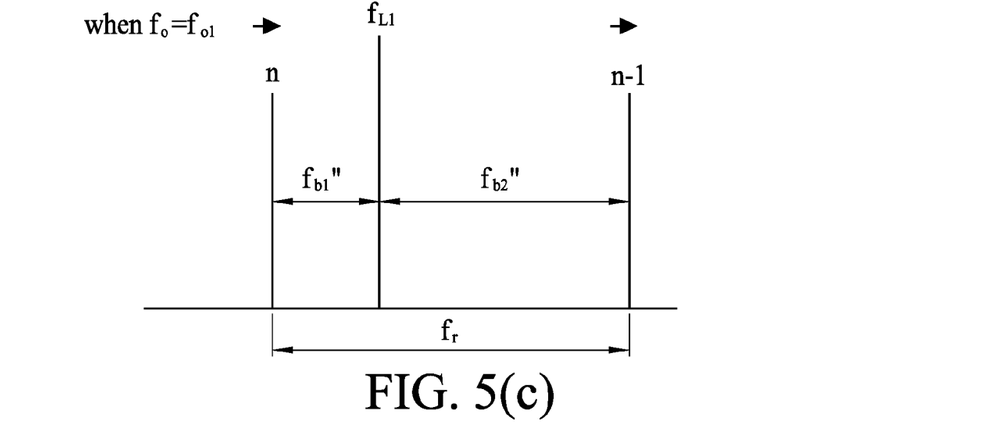
Figure 5D:
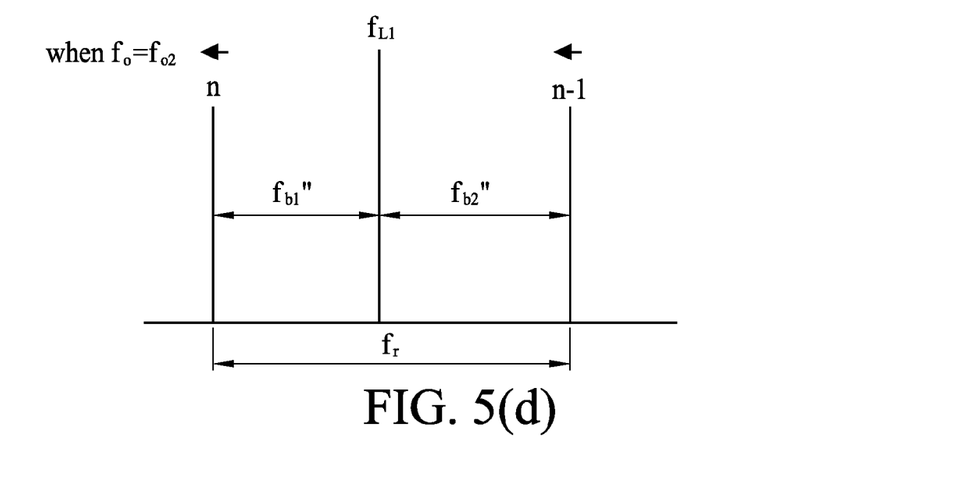

Step S44 determines that $f_L$ is equal to $f_{L1}$ or $f_{L2}$. However, the offset frequency of the mode-locked laser still has to be decided to be $f_{o1}$ or $f_{o2}$. FIG. 5(a) is a flow chart of determining the offset frequency when $f_L$ is equal to $f_{L1}$. By varying the offset frequency, the correct offset frequency can be determined according to the change in the beat frequency. Referring to steps S52-S54 and FIGS. 5(b)-5(d), when $\text{Sign}(f_{o1}'-f_{o1})$ is equal to $\text{Sign}(f_{b1}''-f_{b1})$, $f_{o2}$ can be determined to be the accurate offset frequency; conversely, when $\text{Sign}(f_{o1}'-f_{o1})$ is not equal to $\text{Sign}(f_{b1}''-f_{b1})$, $f_{o1}$ can be determined to be the accurate offset frequency. Here, $\text{Sign}(f_{o1}'-f_{o1})=-\text{Sign}(f_{o2}'-f_{o2})$, and $\text{Sign}(f_{b1}''-f_{b1})=-\text{Sign}(f_{b2}''-f_{b2})$. The verification principle is explained as follows. As shown in step S51, by varying the pump laser power of the mode-locked laser, or varying other factors influencing the offset frequencies, the measured offset frequencies change from $f_{o1}$ to $f_{o1}'$ and from $f_{o2}$ to $f_{o2}'$, and meanwhile, the measured beat frequencies change from $f_{b1}$ to $f_{b1}''$ and from $f_{b2}$ to $f_{b2}'$. Assume the change in the pump power makes $f_{o1}$ increase, i.e. $\text{Sign}(f_{o1}'-f_{o1})$ is a plus. If $f_{o1}$ is the correct offset frequency as shown in FIG. 5(c), all frequency combs shift towards right as the current offset frequency increases, then $f_{b1}''$ should be smaller than $f_{b1}$, i.e. $\text{Sign}(f_{b1}''-f_{b1})$ is a minus. Therefore, if $\text{Sign}(f_{o1}'-f_{o1})$ is not equal to $\text{Sign}(f_{b1}''-f_{b1})$, $f_{o1}$ can be determined to be the accurate offset frequency as shown in step S53, i.e., $f_n=n\times f_r+f_{o1}$. Conversely, if $f_{o2}$ is the correct offset frequency, as shown in FIG. 5(d), all frequency combs shift towards left as the current offset frequency reduces, thus $f_{b1}''$ should be greater than $f_{b1}$, i.e. $\text{Sign}(f_{b1}''-f_{b1})$ is a plus. Therefore, if $\text{Sign}(f_{o1}'-f_{o1})$ is equal to $\text{Sign}(f_{b1}''-f_{b1})$, $f_{o2}$ can be determined to be the accurate offset frequency as shown in step S54, i.e., the frequency of the $n^{th}$ comb line is $f_n=n\times f_r+f_{o2}$.

Figure 6A:
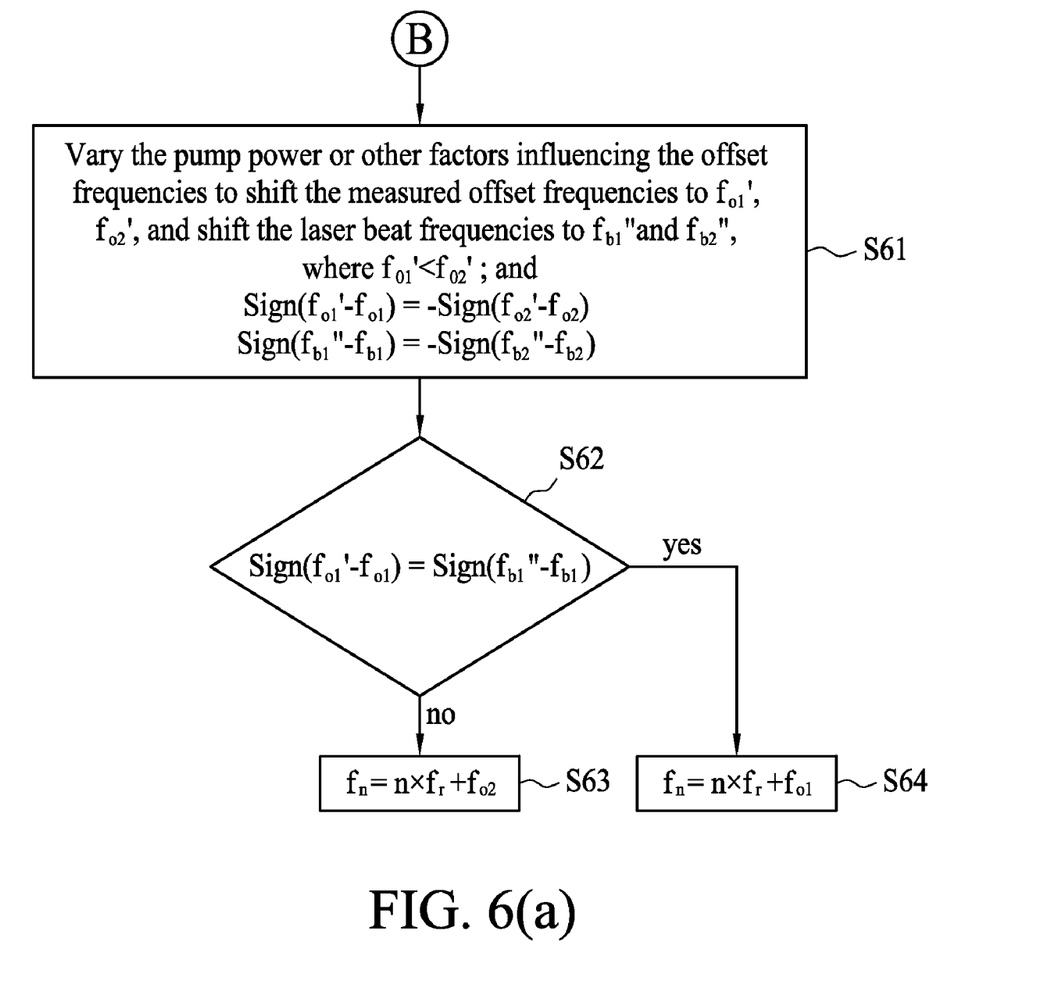
FIG. 6(a) is a flow chart of determining the accurate offset frequency according to the present invention.
Figure 6B:
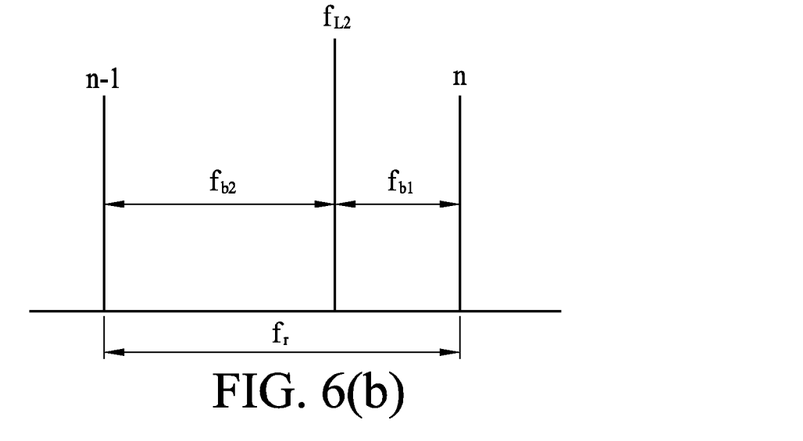
FIGS. 6(b)-6(d) are schematic diagrams of determining the offset frequency by observing the beat frequency variation while changing the offset frequency of the frequency comb according to the present invention.
Figure 6C:
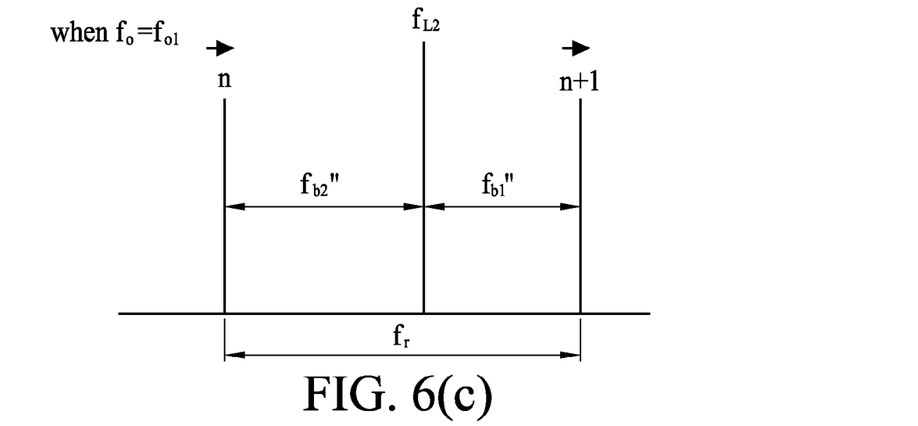
Figure 6D:
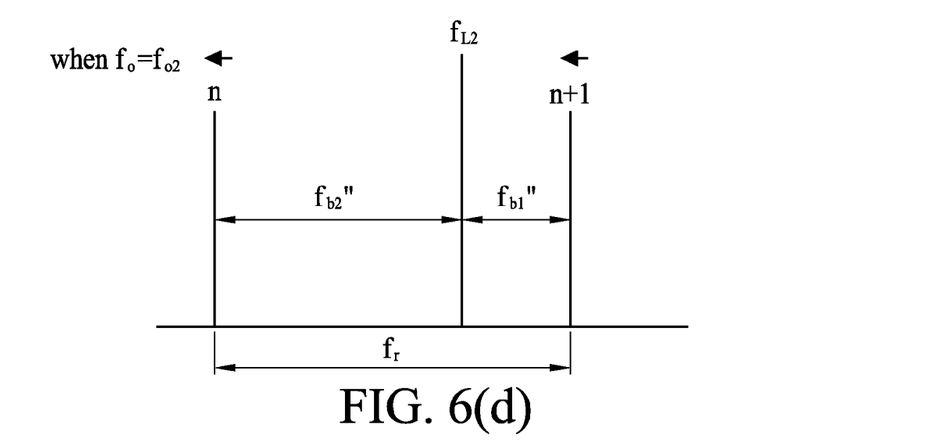

FIG. 6(a) is a flow chart of determining the offset frequency when $f_L$ is equal to $f_{L2}$. The method in FIG. 6(a) is the same as the method in FIG. 5(a), and can be derived from the above rules.

Figure 7A:
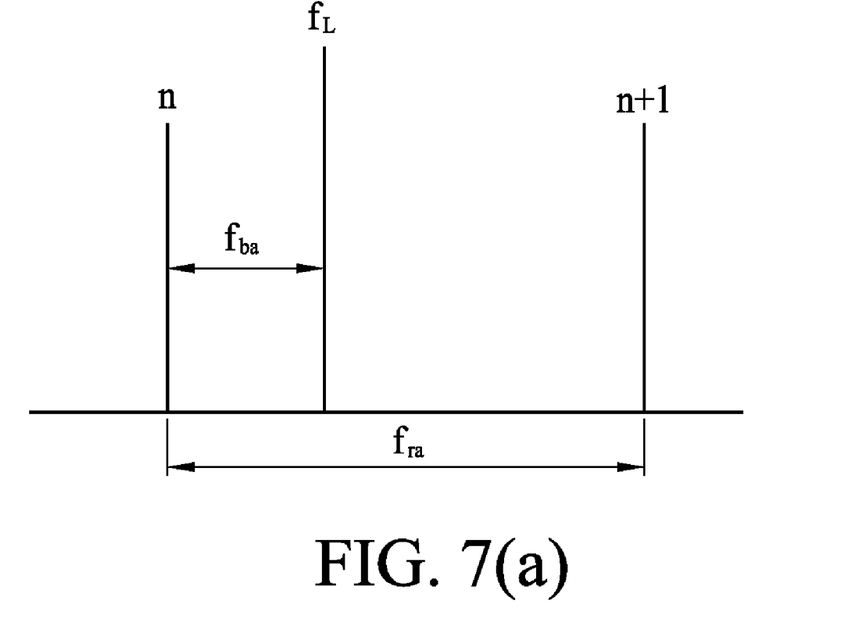
FIGS. 7(a)-7(b) are schematic diagrams of determining the mode number n of the beating comb line by varying the repetition rate according to the present invention.

After the correct beat frequency and offset frequency are obtained, the next step is determining the mode number n of the comb line. The value of n can be determined according to the beat frequencies measured with two mode-locked lasers set at different repetition frequencies. Assuming the measured beat frequency is $f_{ba}$ when the repetition rate is $f_{ra}$ and the offset frequency is $f_{oa}$, the frequency $f_L$ of the unknown laser is represented by the following formula after the relative position of the unknown laser to the beating comb line is determined with the above method, and is as shown in FIG. 7(a), then:

$$f_L=nf_{ra}+f_{oa}+f_{ba} \qquad \text{Formula (1)}$$

Figure 7B:
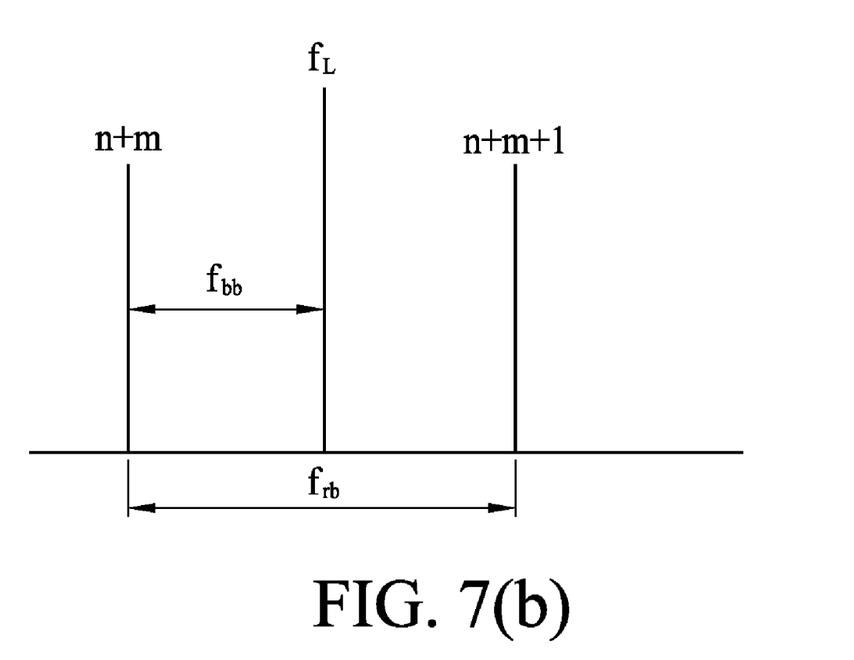

When the repetition rate changes from $f_{ra}$ to $f_{rb}$, the mode number of the beating comb line changes by m accordingly, and the beat frequency measured is $f_{bb}$, as shown in FIG. 7(b). To apply to more general condition, the current offset frequency is supposed to be $f_{ob}$, and therefore the frequency of the unknown laser is represented by the following formula.

$$f_L=(n+m)f_{rb}+f_{ob}+f_{bb} \qquad \text{Formula (2)}$$

Then, the mode number can be derived from Formula (1) and Formula (2):

$$n=(mf_{rb}+f_{ob}-f_{oa}+f_{bb}-f_{ba})/(f_{ra}-f_{rb}) \qquad \text{Formula (3)}$$

The value of m can be determined with two methods. The first method is that the repetition rate of the frequency comb gradually changes from $f_{ra}$ to $f_{rb}$, and the change in the mode order number of the frequency comb is counted during the change in the repetition rate; the second method is that when the beat frequencies are on the same side of the beating comb line and $f_{bb}=f_{ba}$ and $f_{ob}=f_{oa}$, if the difference in the repetition rate required to is change the mode number of a beating comb line by one is measured to be $df_{rb}$, then m is an integer closest to $|f_{ra}-f_{rb}|/|df_{rb}|$. The value of m can be 0, and in such case, the uncertainty of $f_{ob}-f_{oa}+f_{bb}-f_{ba}$ and $f_{ra}-f_{rb}$ needs to be small. Thus, following the above method, the mode number n of the beating comb line can be determined accurately according to Formula (3).

However, as the measured offset frequency and beat frequency have some uncertainty, the value calculated according to Formula (3) is not an exact integer. Therefore, the mode number n of the beating comb line is equal to the integer closest to $(m f_{rb}+f_{ob}-f_{oa}+f_{bb}-f_{ba})/|f_{ra}-f_{rb}|$. After the mode number n of the frequency comb is determined, the frequency of the unknown laser can be calculated according to Formula (1) or Formula (2).

Formula (1)-(3) are derived by assuming the beat frequencies is generated from the larger frequency side of the beating the comb line according to FIGS. 7(a) and 7(b). For other cases, the mode number of the beating comb line can be obtained according to the above method, and the signs of various relevant measured values in Formulae (1)-(3) also need to be properly changed according to corresponding inference processes.

The present invention also discloses a method of absolute optical frequency measurement using two frequency combs. The steps of the entire frequency measurement are similar to the above embodiment, and can also be illustrated with FIGS. 7(a) and 7(b). At this time, the repetition rate $f_{ra}$ of one of the frequency combs remains unchanged, while the repetition rate of the other frequency comb changes from $f_{ra}$ to $f_{rb}$, and the frequency of the unknown laser measured simultaneously with the two frequency combs at different repetition frequencies can also be represented by Formula (1) and Formula (2) respectively. At this time, $f_{ba}$ and $f_{bb}$ can be measured simultaneously and the frequency disturbance of the unknown laser can be eliminated through $f_{ba}-f_{bb}$. Alternatively, the beat frequencies $f_{ba}$ and $f_{bb}$ can be mixed with a frequency mixer to obtain a signal of $f_{ba}-f_{bb}$, which can be directly measured by a frequency counter. Thus, even if the frequency of the unknown laser is not very stable, the uncertainty of $f_{ba}-f_{bb}$ can be reduced as long as the frequencies of the frequency combs remain stable. In such case, the value of n can be measured accurately with small variation of the repetition rate. Usually, it is difficult to maintain mode-locked status when the repetition rate of the mode-locked laser changes greatly. In addition, the value of m can be measured with the same method described above.

These embodiments are explained on the basis of the beat frequency occurring between the unknown laser and the adjacent frequency comb lines. The first beat frequency and the first complementary beat frequency can also occur between the unknown laser and the next adjacent comb lines or the next to the next adjacent comb lines and so on. In such case, the sum of the beat frequency and the first complementary beat frequency is an odd multiple of the repetition rate. Furthermore, the current embodiment is explained on the basis that the sum of the first offset frequency and the first complementary offset frequency is equal to the repetition rate. As to another basis, the sum of the first offset frequency and the first complementary offset frequency can also be an odd multiple of the repetition rate.

The above-described embodiments of the present invention are intended to be illustrative only. Numerous alternative embodiments may be devised by persons skilled in the art without departing from the scope of the following claims.

What is claimed is:

1. A method for measuring the frequency of an unknown laser using at least one mode-locked laser comb, comprising:
   setting the repetition rate of said mode-locked laser to a first repetition rate and generating a first beat frequency between the unknown laser and the $n^{th}$ comb line of said mode-locked laser;
   varying said first repetition rate to determine the relative frequency location of said unknown laser to said $n^{th}$ comb line according to the variation of said first beat frequency; and
   varying the offset frequency of said mode-locked laser to identify the offset frequency of said mode-locked laser according to the variation of said first beat frequency.

2. The method of claim 1, further comprising:
   adjusting said first repetition rate of said mode-locked laser to a second repetition rate;
   measuring the second beat frequency between said unknown laser and a shifted beating comb line;
   and measuring the difference between the mode numbers of said $n^{th}$ comb line and said shifted beating comb line.

3. The method of claim 2, further comprising:
   calculating the mode number n according to the difference between mode numbers of the said $n^{th}$ comb line and said shifted beating comb line, said repetition rates, the difference between said offset frequencies, the difference or the sum of said beat frequencies and the difference between said repetition rates.

4. The method of claim 2, wherein the difference between the mode numbers of said $n^{th}$ comb line and said shifted beating comb line is obtained by counting the shifted mode number when said first repetition rate gradually changes to said second repetition rate.

5. The method of claim 2, wherein the difference between the mode numbers of said $n^{th}$ comb line and said shifted beating comb line is obtained by measuring the difference in repetition rate required to shift the mode number of the comb line adjacent to said unknown laser by one, and is equal to the integer nearest to the ratio of the difference between said first and said second repetition rate to said difference in repetition rate required to shift the mode number of the comb line adjacent to said unknown laser by one.

6. The method of claim 2, wherein said difference between the mode numbers of said $n^{th}$ comb line and said shifted beating comb line is zero.

7. The method of claim 2, wherein two mode-locked lasers are used to measure the mode numbers of said $n^{th}$ comb line and said shifted beating comb line, and the repetition rate of one of the mode-locked lasers is varied while the repetition rate of the other mode-locked laser remains unchanged.

8. A method measuring the frequency of an unknown laser using at least one mode-locked laser comb, comprising:
   measuring the offset frequency of said mode-locked laser through a self-referencing technique to obtain a first offset frequency and a first complementary offset frequency, where said first offset frequency has a smaller value than said first complementary offset frequency;
   setting the repetition rate of said mode-locked laser to be a first repetition rate and generating a first beat frequency with a smaller value and a first complementary beat frequency with a larger value between said unknown laser and adjacent comb lines or sub-adjacent comb lines in turn of said mode-locked laser, wherein said first beat frequency occurs between said unknown laser and the $n^{th}$ comb line of said mode-locked laser;
   varying said first repetition rate of said mode-locked laser to determine the position of said first beat frequency relative to said $n^{th}$ comb line according to the relationship between the sign of the change in said repetition rate and the sign of the change in said first beat frequency or the sign of change in said first complementary beat frequency; and
   varying the offset frequency of said mode-locked laser to determine the actual offset frequency according to the relationship between the sign of the change in said offset frequency and the sign of the change in said first beat frequency or the sign of the change in said first complementary beat frequency.

9. The method of claim 8, further comprising:
   setting the repetition rate of said mode-locked laser to a second repetition frequency to generate a second beat frequency and a second complementary beat frequency between said unknown laser and adjacent comb lines or sub-adjacent comb lines in turn of said mode-locked laser, wherein said second beat frequency occurs between said unknown laser and the $(n+m)^{th}$ comb line of said mode-locked laser and is smaller than said second complementary beat frequency;
   varying the repetition rate of said mode-locked laser, and determining the relative frequency location of said unknown laser to said $(n+m)^{th}$ comb line according to the relationship between the sign of the change in said second repetition rate and the sign of the change in said second beat frequency or the sign of the change in said second complementary beat frequency;
   measuring the shifted mode number m of said $(n+m)^{th}$ comb line when said first repetition rate changes to said second repetition rate; and
   deriving the mode number n of said $n^{th}$ comb line according to the difference between said first repetition rate and said second repetition rate, said second repetition rate, said first beat frequency or said first complementary beat frequency, said second beat frequency or said second complementary beat frequency, and said shifted mode number m to obtain the frequency of said unknown laser.

10. The method of claim 8, wherein if the sign of the change in said first repetition rate is equal to the sign of the change in said first beat frequency, then the frequency of said unknown laser is equal to the frequency of said $n^{th}$ comb line minus said first beat frequency.

11. The method of claim 8, wherein if the sign of the change in said first repetition rate is not equal to the sign of the change in said first beat frequency, the frequency of said unknown laser is equal to the frequency of said $n^{th}$ comb line plus said first beat frequency.

12. The method of claim 11, wherein when the frequency of said unknown laser is equal to the frequency of said $n^{th}$ comb line plus said first beat frequency, and if the sign of the change in said first offset frequency is equal to the sign of the change in said first beat frequency during a variation in said first offset frequency, then the actual offset frequency of said mode-locked laser is equal to said first complementary offset frequency.

13. The method of claim 11, wherein when the frequency of said unknown laser is equal to the frequency of said $n^{th}$ comb line plus said first beat frequency, and if the sign of the change in said first offset frequency is not equal to the sign of the change in said first beat frequency during a variation in the first offset frequency, then the actual offset frequency of said mode-locked laser is equal to said first offset frequency.

14. The method of claim 10, wherein when the frequency of said unknown laser is equal to the frequency of said $n^{th}$ comb line minus said first beat frequency, and if the sign of the change in said first offset frequency is equal to the sign of the change in said first beat frequency during a variation in said first offset frequency, then the actual offset frequency of said mode-locked laser is equal to said first offset frequency.

15. The method of claim 10, wherein when the frequency of said unknown laser is equal to the frequency of said $n^{th}$ comb line minus said first beat frequency, and if the sign of the change in said first offset frequency is not equal to the sign of the change in said first beat frequency during a variation in said first offset frequency, then the actual offset frequency of said mode-locked laser is equal to said first complementary offset frequency.

16. The method of claim 10, 11, 12, 13, 14, or 15, wherein the sign of the change in said first beat frequency is equal to the opposite sign of the change in said first complementary beat frequency, and the sign of the change in said first offset frequency is equal to the opposite sign of the change in said first complementary offset frequency.

17. The method of claim 9, wherein said change in mode number from said $n^{th}$ comb line to said $(n+m)^{th}$ comb line is obtained by counting the change in mode number during the change in said repetition rate.

18. The method of claim 9, wherein said change in mode number from said $n^{th}$ comb line to said $(n+m)^{th}$ comb line is obtained by measuring the change in repetition rate required to change the mode number of the comb line adjacent to said unknown laser by one, and is equal to the integer nearest to the ratio of the difference between said first repetition rate and said second repetition rate to said difference in repetition rate required to change the mode number of the comb line adjacent to said unknown laser by one.

19. The method of claim 9, wherein when the repetition rate changes from said first repetition rate to said second repetition rate, said change in the mode number from said $n^{th}$ comb line to said $(n+m)^{th}$ comb line can be zero.

20. The method of claim 8, wherein the sum of said first beat frequency and said first complementary beat frequency is equal to odd multiple of said first repetition rate.

21. The method of claim 9, wherein the sum of said second beat frequency and said second complementary beat frequency is equal to odd multiple of said second repetition rate.

22. A method of optical frequency measurement using two mode-locked lasers to measure the frequency of an unknown laser, comprising the steps of:
measuring offset frequencies of the two mode-locked lasers with a self-referencing technique to obtain a first offset frequency and a first complementary offset frequency of the first mode-locked laser and to obtain a second offset frequency and a second complementary offset frequency of the second mode-locked laser, where said first offset frequency has a smaller value than said first complementary offset frequency and said second offset frequency has a smaller value than said second complementary offset frequency;
setting the repetition rate of said first mode-locked laser to a first repetition rate, setting the repetition rate of said second mode-locked laser to a second repetition rate, and measuring beat frequencies between said unknown laser and said two mode-locked lasers simultaneously;
generating a first beat frequency and a first complementary beat frequency by said unknown laser and adjacent comb lines or sub-adjacent comb lines in turn of said first mode-locked laser, wherein said first beat frequency is generated by said unknown laser and the $n^{th}$ comb line of said first mode-locked laser and is smaller than said first complementary beat frequency;
generating a second beat frequency and a second complementary beat frequency by said unknown laser and adjacent comb lines or sub-adjacent comb lines in turn of said second mode-locked laser, wherein said second beat frequency is generated by said unknown laser and the $(n+m)^{th}$ comb line of said second mode-locked laser and is smaller than said second complementary beat frequency;
varying the repetition rate of said first mode-locked laser to determine the relative frequency location of said unknown laser to said $n^{th}$ comb line according to the relationship between the sign of the change in said repetition rate of said first mode-locked laser and the sign of the change in said first beat frequency or the sign of the change in said first complementary beat frequency; and
varying said first offset frequency of said first mode-locked laser to determine the actual offset frequency of said first mode-locked laser according to the relationship between the sign of the change in said first offset frequency of said first mode-locked laser and the sign of the change in said first beat frequency or the sign of the change in said first complementary beat frequency.

23. The method of optical frequency measurement of claim 22, further comprising:
varying the repetition rate of said second mode-locked laser to determine the relative frequency location of the unknown laser to said $(n+m)^{th}$ comb line of said second mode-locked laser according to the relationship between the sign of the change in said repetition rate of said second mode-locked laser and the sign of the change in said first beat frequency or the sign of the change in said first complementary beat frequency;
measuring the mode number difference m between said $n^{th}$ comb line and $(n+m)^{th}$ comb line of said two mode-locked lasers which generate said first beat frequency and said second beat frequency with said unknown laser;
deriving the mode order number n of said $n^{th}$ comb line according to said first repetition rates and said second repetition rate of said two mode-locked lasers, the offset frequency difference between said two mode-locked lasers, the beat frequencies and the complementary beat frequencies between said two mode-locked lasers and said unknown laser, and said mode number difference between said $n^{th}$ comb line and said $(n+m)^{th}$ comb line.

24. The method of optical frequency measurement of claim 22, wherein if the sign of the change in said first repetition rate of said first mode-locked laser is equal to the sign of the change in said first beat frequency, then the frequency of said unknown laser is equal to the frequency of said $n^{th}$ comb line of said first mode-locked laser minus said first beat frequency.

25. The method of optical frequency measurement of claim 22, wherein if the sign of the change in said repetition rate of said first mode-locked laser is not equal to the sign of the change in said first beat frequency, then the frequency of said unknown laser is equal to the frequency of said $n^{th}$ comb line of said first mode-locked laser plus said first beat frequency.

26. The method of optical frequency measurement of claim 25, wherein when the frequency of said unknown laser is equal to the frequency of said $n^{th}$ comb line of said first mode-locked laser plus said first beat frequency, and if the sign of the change in said first offset frequency of said first mode-locked laser is equal to the sign of the change in said first beat frequency during a variation of said first offset frequency, then the actual offset frequency of said first mode-locked laser is equal to said first complementary offset frequency.

27. The method of optical frequency measurement of claim 25, wherein when the frequency of said unknown laser is equal to the frequency of said $n^{th}$ comb line of said first mode-locked laser plus said first beat frequency, and if the sign of the change in said first offset frequency of said first mode-locked laser is not equal to the sign of the change in said first beat frequency during a variation of said first offset frequency, then the actual offset frequency of said first mode-locked laser is equal to said first offset frequency.

28. The method of optical frequency measurement of claim 24, wherein when the frequency of said unknown laser is equal to the frequency of said $n^{th}$ comb line of said first mode-locked laser minus said first beat frequency, and if the sign of the change in said first offset frequency of said first mode-locked laser is equal to the sign of the change in said first beat frequency during a variation of said first offset frequency, then the actual offset frequency of said first mode-locked laser is equal to said first offset frequency.

29. The method of optical frequency measurement of claim 24, wherein when the frequency of said unknown laser is equal to the frequency of said $n^{th}$ comb line of said first mode-locked laser minus said first beat frequency, and if the sign of the change in said first offset frequency of said first mode-locked laser is not equal to the sign of the change in said first beat frequency during a variation of said first offset frequency, then the actual offset frequency of said first mode-locked laser is equal to said first complementary offset frequency.

30. The method of optical frequency measurement of claim 23, wherein if the sign of the change in said second repetition rate of said second mode-locked laser is equal to the sign of the change in said second beat frequency, then the frequency of said unknown laser is equal to the frequency of said $(n+m)^{th}$ comb line of said second mode-locked laser minus said second beat frequency.

31. The method of optical frequency measurement of claim 23, wherein if the sign of the change in said repetition rate of said second mode-locked laser is not equal to the sign of the change in said second beat frequency, then the frequency of said unknown laser is equal to the frequency of said $(n+m)^{th}$ comb line of said second mode-locked laser plus said second beat frequency.

32. The method of optical frequency measurement of claim 31, wherein when the frequency of said unknown laser is equal to the frequency of said $(n+m)^{th}$ comb line of said second mode-locked laser plus said second beat frequency and, and if the sign of the change in said second offset frequency of said second mode-locked laser is equal to the sign of the change in said second beat frequency while said second offset frequency of said second mode-locked laser is changed, then the actual offset frequency of said second mode-locked laser is equal to said second complementary offset frequency of said second mode-locked laser.

33. The method of optical frequency measurement of claim 31, wherein when the frequency of said unknown laser is equal to the frequency of said $(n+m)^{th}$ comb line of said second mode-locked laser plus said second beat frequency, and if the sign of the change in said second offset frequency of said second mode-locked laser is not equal to the sign of the change in said first beat frequency while said second offset frequency of said second mode-locked laser is changed, then the actual offset frequency of said second mode-locked laser is equal to said second offset frequency of said second mode-locked laser.

34. The method of optical frequency measurement of claim 30, wherein when the frequency of said unknown laser is equal to the frequency of said $(n+m)^{th}$ comb line of said second mode-locked laser minus said second beat frequency, and if the sign of the change in said second offset frequency of said second mode-locked laser is equal to the sign of the change in said first beat frequency while said second offset frequency of said second mode-locked laser is changed, then the actual offset frequency of said second mode-locked laser is equal to said second offset frequency of said second mode-locked laser.

35. The method of optical frequency measurement of claim 30, wherein when the frequency of said unknown laser is equal to said $(n+m)^{th}$ comb line of said second mode-locked laser minus said second beat frequency, and if the sign of the change in said second offset frequency of said second mode-locked laser is not equal to the sign of the change in said first beat frequency while said second offset frequency of said second mode-locked laser is varied, then the actual offset frequency of said second mode-locked laser is equal to said second complementary offset frequency of the second mode-locked laser.

36. The method of optical frequency measurement of claim 24, 25, 26, 27, 28, 29, 30, 31, 32, 33, 34, or 35, wherein the sign of the change in said first beat frequency is equal to the opposite sign of the change in said first complementary beat frequency; the sign of the change in said second beat frequency is equal to the opposite sign of the change in said second complementary beat frequency; the sign of the change in said first offset frequency of said first mode-locked laser is equal to the opposite sign of the change in said first complementary offset frequency of said first mode-locked laser; and the sign of the change in said second offset frequency of said second mode-locked laser is equal to the opposite sign of the change in said second complementary offset frequency of said second mode-locked laser.

37. The method of optical frequency measurement of claim 23, wherein the difference in the mode numbers between said $n^{th}$ comb line and said $(n+m)^{th}$ comb line is obtained by counting the change in mode number when the repetition rate of said second mode-locked laser changes from said first repetition rate to said second repetition rate.

38. The method of optical frequency measurement of claim 23, wherein the difference in mode number between said $n^{th}$ comb line and said $(n+m)^{th}$ comb line is obtained by measuring the difference in repetition rate required to change the mode number of the comb line adjacent to said unknown laser by one, and is equal to the integer nearest to the ratio of the difference between said first repetition rate and said second repetition rate to said difference in repetition rate required to change the mode number of the comb line adjacent to said unknown laser by one.

39. The method of optical frequency measurement of claim 23, wherein the change in the mode number from said $n^{th}$ comb line to said $(n+m)^{th}$ comb line can be zero.

40. The method of optical frequency measurement of claim 23, wherein the difference or sum of said beat frequencies and said complementary beat frequencies between said two mode-locked lasers and said unknown laser is obtained by using a frequency mixer to mix said beat frequencies or complementary beat frequencies.

41. The method of optical frequency measurement of claim 22, wherein the sum of said first beat frequency and said first complementary beat frequency is equal to odd multiple of said first repetition rate.

42. The method of optical frequency measurement of claim 23, wherein the sum of said second beat frequency and said second complementary beat frequency is equal to odd multiple of said second repetition rate.

* * * * *